Oct. 25, 1927.

D. DILEO

PIPE FITTING

Filed Dec. 24, 1924

Dominick Dileo, Inventor

By Victor J. Evans, Attorney

Patented Oct. 25, 1927.

1,647,036

UNITED STATES PATENT OFFICE.

DOMINICK DILEO, OF UTICA, NEW YORK.

PIPE FITTING.

Application filed December 24, 1924. Serial No. 757,884.

This invention relates to pipe fittings and has for an object the provision of a soil pipe fitting provided with means to permit of testing sewerage and drainage soil pipes in the event of stoppage or for testing the efficiency of the work after installation.

To this end, the invention aims to provide a pipe fitting in which is included a valve capable of being operated to obstruct the passage of water or air through the fitting, whereby sewerage and drainage pipes may be tested by the introduction of water or air under pressure.

Another object of the invention is to provide a construction wherein the valve when in open position will be entirely out of the path of sewerage from the pipe so as not to present an obstruction.

With the above and other objects in view, the invention further includes the following novel features and details of construction, to be hereinafter more fully described, illustrated in the accompanying drawings and pointed out in the appended claim.

In the drawings:—

Figure 1:
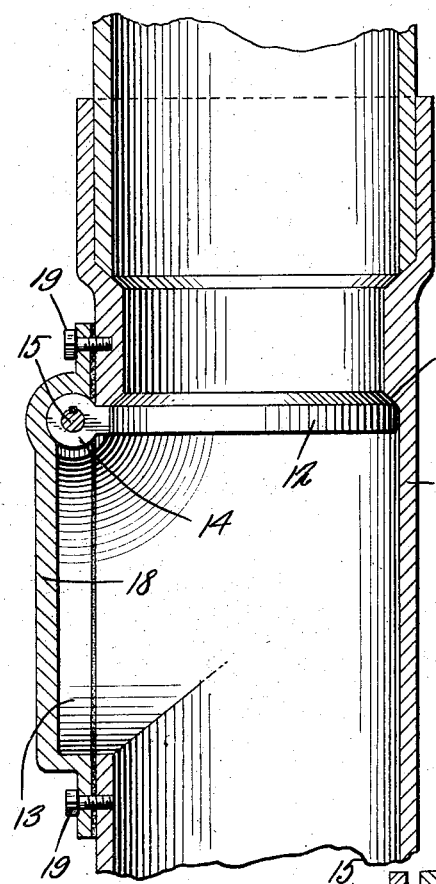
Figure 1 is a sectional view of a pipe fitting constructed in accordance with the invention with the valve in closed position.
Figure 2:
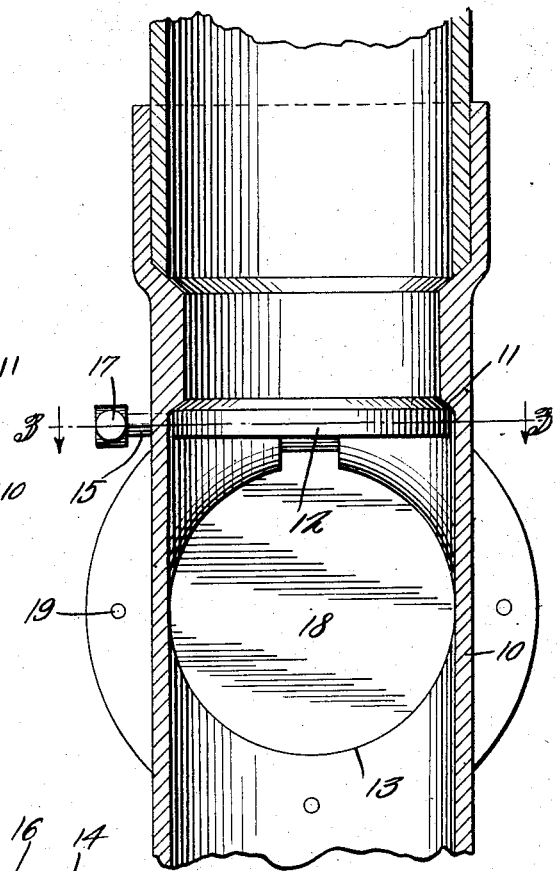
Figure 2 is a sectional view at right angles to Figure 1.
Figure 3:
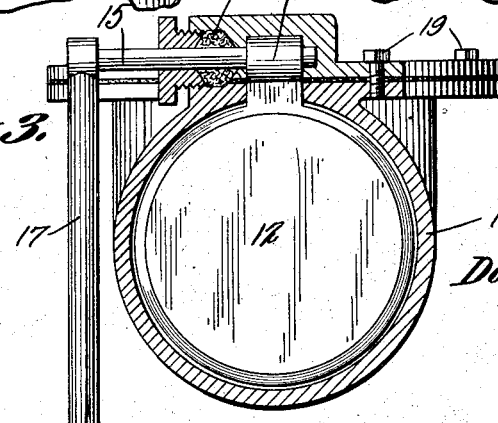
Figure 3 is a section on the line 3—3 of Figure 2.

Referring in detail to the drawings wherein like characters of reference denote corresponding parts, the reference character 10 indicates a pipe fitting which may be of any well known type such as an elbow, T, cross, Y and so forth.

The fitting is provided with a beveled seat 11 which is adapted to be engaged by a beveled disk valve 12, the latter being provided with a rubber or similar facing so as to provide an air and water tight joint.

The fitting is provided with an offset chamber 13 which is adapted to receive the valve when the latter is in open position so that the valve will not interfere with the passage of sewerage and the like through the fitting. The valve has extending from its periphery an apertured lug 14 which is adapted to fit snugly in a socket formed in the wall of the chamber and which is secured upon a pivot or hinge pin 15, the latter being mounted in a suitable bearing in the fitting. A stuffing box 16 prevents leakage. Secured upon the pin 15 is an operating handle 17.

The chamber 13 may be formed in any suitable manner, the one shown consisting of a cast cover 18 which is secured to the fitting by means of screws or bolts 19. This provides for convenience in assembling.

The invention is susceptible of various changes in its form, proportions and minor details of construction and the right is herein reserved to make such changes as properly fall within the scope of the appended claim.

Having described the invention what is claimed is:—

In a pipe fitting, a tubular member having a beveled concentric valve seat, a beveled disk valve cooperating with the seat, a removable cover having a socket and a chamber offset from the tubular member, an apertured lug integral with the disk valve, the said lug fitting snugly in the socket of the cover, and pivoted on a pin passing through the aperture in the lug and extending beyond the cover, a rod on the extended end of the pin serving as a handle for the disk valve, and a packing means around the pin.

In testimony whereof I affix my signature.

DOMINICK DILEO.